Patented Jan. 6, 1953

2,624,737

UNITED STATES PATENT OFFICE 2,624,737

PIPERIDINIUM COMPOUNDS

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application June 19, 1951, Serial No. 232,464

3 Claims. (Cl. 260—293)

This invention relates to 4,4'-polymethylene-bis(1-lower alkyl-1-(R)-piperidinium salts) wherein R represents phenethyl and nitrophenethyl. The new compounds are useful in the field of therapeutics, and more particularly possess curare-like activity.

In general, the new compounds can be prepared by reacting 4,4'-polymethylene-bipiperidine with a phenethyl halide, or a phenethyl halide substituted by a nitro group in the phenyl nucleus, to form the corresponding 4,4'-polymethylenebis(1-R-piperidines) where R has the same meaning as given hereinabove, and quaternizing the latter with a reactive alkyl ester, for example, a lower alkyl halide, a lower dialkyl sulfate, and the like. The preparation of the 4,4'-polymethylenebis(1-R-piperidines) is illustrated by the following examples:

EXAMPLE A

*4,4'-ethylenebis(1-phenethylpiperidine)*

To a stirred and refluxing solution of 16 grams of 4,4'-ethylenebipiperidine (obtained by the catalytic hydrogenation of 4,4'-ethylenebipyridine according to the method of Thayer and Corson, J. Am. Chem. Soc. 70, 2330–33 at page 2331) in 600 cc. of benzene were added, over a period of 4 hours, 15 grams of β-phenethyl-bromide in 400 cc. of benzene. The solids which formed were filtered off. The filtrate was stirred and refluxed for 4 periods of 4 hours each, the solids which formed being filtered off after each period. The final filtrate was evaporated to dryness in vacuo and the residue so formed was taken up in chloroform and extracted with water. The chloroform solution was then dried and evaporated to dryness in vacuo. The residue was crystallized from acetonitrile and recrystallized from acetone. The 4,4'-ethylenebis(1-phenethylpiperidine) thus obtained melted at 109–112° C.

EXAMPLE B

*4,4'-ethylenebis[1-(p-nitrophenethyl)piperidine]*

To 200 cc. of benzene containing 2.9 grams of 4,4'-ethylene-bipiperidine were added 3.4 grams of p-nitrophenethyl bromide in 100 cc. of benzene. The mixture was stirred and refluxed for 2½ hours, allowed to stand at 25° C. for 18 hours, and the solids which formed were filtered off. The filtrate was refluxed for 4 periods of 3 hours each, the solids being filtered off after each period. The final filtrate was evaporated to dryness in vacuo. The residue was eluated with dry acetone. The yellow crystals which formed on concentrating the acetone eluate were recrystallized from acetone and from a chloroform-ether mixture. The 4,4'-ethylenebis[1-(p-nitrophenethyl)piperidine] thus obtained melted at 171–172° C.

EXAMPLE C

*4,4'-trimethylenebis[1-(p-nitrophenethyl)-piperidine]*

84 grams of 4-vinyl-pyridine and 372 grams of dry 4-picoline were added to 80 cc. of benzene containing 20 mg. of hydroquinone. The solution was stirred and 1 gram of potassium was added and the resulting solution refluxed at 105° C. for 45 minutes. The reaction mixture was cooled to 25° C. and the potassium destroyed with ethanol after which the benzene solution was extracted with water and with saturated sodium bisulfite solution. The benzene solution was dried and evaporated in vacuo. The oily residue was crystallized from acetone, yielding 4,4'-trimethylene-bipyridine, M. P. 57–60° C. 28.8 grams of 4,4'-trimethylene-bipyridine were dissolved in 100 cc. of 6N hydrochloric acid and hydrogenated at 1500 lbs./sq. in. at 50° C. in the presence of 2 grams of platinum oxide. After the hydrogen uptake had ceased, the catalyst was filtered and the filtrate made strongly alkaline with 30% sodium hydroxide solution. The resulting mixture was extracted well with chloroform and the dried chloroform extracts combined and evaporated to dryness in vacuo. The crystalline residue was recrystallized from acetone, yielding 4,4'-trimethylene-bipiperidine. The free base was converted into the dihydrochloride by treating the base dissolved in methanol with hydrogen chloride in ether. After two recrystallizations from methanol–ether, the dihydrochloride melted at 265–269° C. with decomposition. To a stirred and refluxing solution of 14.9 gms. of 4,4'-trimethylene-bipiperidine in 250 cc. of benzene there was slowly added over a period of one hour at solution of 16.5 gms of p-nitrophenethyl bromide in 250 cc. of benzene. The reaction mixture was then refluxed for 22 hours and the solids which formed were separated by filtration. The filtrate was extracted with 3N hydrochloric acid the aqueous extract was made strongly alkaline by the addition of sodium hydroxide and then extracted with chloroform. The chloroform extract was dried and evaporated to dryness in vacuo and the residue so obtained was crystallized from acetone-petroleum ether. The 4,4'-trimethylenebis[1-(p-nitrophenethyl)piperidine] thus obtained melted at 98–99° C.

The preparation of the 4,4'-polymethylenebis-(1-lower alkyl-1-(R)-piperidinium salts) is illustrated by the following examples:

EXAMPLE 1

*4,4'-ethylenebis(1-phenethyl-1-methylpiperidinium bromide)*

To 3 grams of 4,4'-ethylenebis(1-phenethylpiperidine) in 25 cc. of chloroform were added 2.6 grams of methyl bromide in 25 cc. of acetone. After standing for 18 hours at 25° C., the crystals which formed were separated and recrystallized first from methanol-ether, then from dilute aqueous acetone, and finally from water. The 4,4'-ethylenebis(1-phenethyl- 1 -methylpiperidinium bromide) thus obtained melted at 284–297° C. with decomposition.

EXAMPLE 2

*4,4'-ethylenebis[1-(p-nitrophenethyl)-1-methylpiperidinium bromide]*

To 270 mg. of 4,4'-ethylenebis(1-p-nitrophenethylpiperidine) in 10 cc. of a 1:1 chloroform-benzene solution were added 3.2 grams of methyl bromide in acetone. The yellow crystals which formed on standing were separated and recrystallized twice from water. The 4,4'-ethylenebis-[1-(p - nitrophenethyl) - 1 - methylpiperidinium bromide] thus obtained melted at 284–288° C. with decomposition.

EXAMPLE 3

*4,4'-trimethylenebis[1-(p-nitrophenethyl)-1-methylpiperidinium bromide]*

One gram of 4,4'-trimethylenebis[1-(p-nitrophenethyl)piperidine] was dissolved in 10 cc. of chloroform and the solution diluted to a volume of 100 cc. with acetone. 1.5 gms. of methyl bromide in 15 cc. of acetone were added. After standing at 25° C. for 18 hours, the supernatant liquid was decanted from the oily solid which had formed. The oily solid was crystallized from a mixture of methanol, acetone and ether. The product was recrystallized from methanol-acetone. The 4,4' - trimethylenebis[1 - (p - nitrophenethyl)-1-methylpiperidinium bromide] thus obtained melted at 184–186° C. with decomposition.

Compounds disclosed herein wherein R represents nitro-phenethyl are claimed in our continuation-in-part application Serial No. 262,682, filed December 20, 1951.

We claim:

1. 4,4' - polymethylenebis(1 - lower alkyl-1-phenethyl-piperidinium salts) in which the polymethylene group contains from 2 to 3 carbon atoms.

2. A 4,4'-ethylenebis(1-lower alkyl-1- phenethylpiperidinium halide).

3. 4,4' - ethylenebis(1 - phenethyl - 1 - methylpiperidinium bromide).

MOSES WOLF GOLDBERG.
LESTER MISCHA JAMPOLSKY.

REFERENCES CITED

The following references are of record in the file of this patent:

Thayer, J. Am. Chem. Soc., vol. 70, 1948, pp. 2330–2333.